Oct. 17, 1967 R. R. FREAS 3,348,229

RECORDING OF ANALOG DATA ON PHOTOGRAPHIC FILM

Filed Nov. 29, 1965 3 Sheets-Sheet 1

INVENTOR.
ROBERT R. FREAS

BY [signature] AGENT

[signature] ATTORNEY

RECORDING OF ANALOG DATA ON PHOTOGRAPHIC FILM

Filed Nov. 29, 1965 3 Sheets-Sheet 2

TYPICAL MICRO-FILM PRESENTATION

RECORDING OF ANALOG DATA ON PHOTOGRAPHIC FILM

Filed Nov. 29, 1965

3 Sheets-Sheet 3

United States Patent Office 3,348,229
Patented Oct. 17, 1967

3,348,229
RECORDING OF ANALOG DATA ON PHOTOGRAPHIC FILM
Robert R. Freas, 3871 Topanga Lane, Malibu, Calif. 90265
Filed Nov. 29, 1965, Ser. No. 510,480
7 Claims. (Cl. 346—23)

ABSTRACT OF THE DISCLOSURE

Apparatus for recording analog data on a sensitized medium by the use of a cathode-ray tube of the dual-beam type, one beam being employed on a time-sharing basis to develop the data trace and also to produce a series of horizontal grid lines on which the signal information is superimposed. The remaining beam of the CRT is utilized to trace a series of vertical grid lines to permit a ready evaluation of the time or phase characteristics of the signal. Every *n*th vertical grid line may be intensified to aid in such evaluation.

The invention described herein may be manufactured and used by or for the Government of the United States of America for governmental purposes without the payment of any royalties thereon or therefor.

The present invention relates to apparatus for recording analog data directly on a sensitized medium such as microfilm.

It is frequently desirable to record intelligence in permanent form for subsequent evaluation and/or analysis. Such data may, for example, represent the performance of one or more components incorporated in an aircraft or guided missile. It is only by analyzing this information that the cause of some malfunction or irregularity in operation can in many cases be determined and corrective measures taken to prevent a recurrence thereof. Although numerous arrangements are presently utilized for developing a permanent record of data which is highly transient in nature, nevertheless each of these presently-known systems possesses certain inherent disadvantages.

Perhaps the best known system of recording and reproducing analog data is a strip-chart recorder which incorporates a galvanometer-driven pen or stylus. Also standard is a galvanometer-driven light-beam-deflection oscillograph, the latter customarily including a roll of photographic paper on which the data is presented. Although such a system is satisfactory for obtaining a single record of data which varies at very low frequency, nevertheless the reproduction of this data (in the event that a number of copies are required) is both complex and time-consuming. For example, the required duplication process may require a development of the photographic paper on which the signal has been recorded, the photographing of this paper by a camera utilizing microfilm, and then the reproduction of the filmed data by some mechanical apparatus such, for example, as that known commercially as the Xerox CopyFlo. The number of steps in this process, and the time required to obtain finished copies, causes considerable inconvenience.

In presently-known systems of the type in which data is recorded on a strip of paper by means of a galvanometer-driven pen or stylus, not only is the initial cost of the equipment relatively high, but the expense involved in operation is frequently prohibitive due to the cost of the large amounts of paper required. In the case of the light-beam type of recording apparatus, the cost of the photographic paper utilized is even greater, and to this must be added the expense of the chemicals employed for processing, as well as the labor charges involved. However, perhaps the most serious drawback in the galvanometer-driven pen or stylus arrangement is that it possesses a relatively low frequency response, and hence is only capable of satisfactorily recording data which recurs relatively slowly. In many cases, the upper limit at which such a device will operate is in the neighborhood of 100 c.p.s. With respect to the light-beam-deflection strip-chart recorder, the frequency response is somewhat better, but ordinarily does not exceed approximately 10 kilocycles. Even this figure is inadequate for many data-recording applications, especially at the present time when numerous testing functions are carried out at a base frequency far exceeding this value. Consequently, the need for low-cost recording equipment which operates in the upper region of the frequency spectrum is widespread.

In accordance with a feature of the present invention, a known process of the nature set forth above for recording and reproducing analog data is simplified with respect to the number of steps which are necessary in order to obtain a large number of copies of any continuously-carrying analog signal, as well as with respect to the time required between the reception of this data and the instant at which multiple copies are available for direct use. By eliminating a number of the steps formerly thought necessary, the initial cost of the recording and reproducing equipment is lowered, together with the expense of operating the equipment over any given period of time.

In a preferred embodiment, the present concept dispenses with such devices as a galvanometer-driven pen or stylus, as well as arrangements in which a beam of light is deflected onto a sensitized paper. In place of such apparatus, an incoming analog signal is electrically coupled to one set of deflection plates of a dual-beam oscilloscope. A camera is then arranged to photograph the screen of the oscilloscope, this camera being of the type utilizing a continuously-running microfilm. In accordance with a feature of the invention, the same electron beam of the oscilloscope which traces the analog data on the screen is also employed on a time-sharing basis to develop a series of horizontal grid or reference lines which are in effect superimposed upon the signal as filmed, thereby facilitating an instant evaluation of the amplitude of the latter at any particular instant of time. A particular electrical network is then employed to generate a regularly-recurring saw-tooth wave which is applied to another set of deflection plates of the oscilloscope so as to deflect the remaining electron beam thereof in such a manner as to develop a series of essentially vertical grid lines at a desired spacing. The speed at which the film moves through the camera is coordinated with the development of these grid lines so that the latter, while developed on the screen of the oscilloscope with a slanted or diagonal orientation, appear on the microfilm in essentially vertical position. These vertical grid lines provide a means whereby the time or phase characteristics of the analog signal can be readily evaluated in comparison with a known reference. To aid in this evaluation, the present invention further contemplates the enhancement or intensification of every *n*th grid line (such, for example, as every 5th line, every 10th line, etc.) so that the character of any portion of the varying analog signal may be readily ascertained. The regularly-recurring saw-tooth wave developed on the screen of the oscilloscope is thus superimposed upon the analog signal, together with the series of horizontal grid lines, so that the entire presentation is of unitary form and permits a ready evaluation of all characteristics of the signal which might be of interest. Although the concept has been briefly set forth in connection with a signal channel of data, the invention contemplates the presentation of a plurality of independent signals, displaced vertically with respect to one another, all of such presentations occurring simultaneously to appear in spaced-apart relation upon the microfilm.

One object of the present invention, therefore, is to provide an improved apparatus for recording recurring electrical phenomena on a photographic film.

Another object of the invention is to provide a system for developing a presentation, on the screen of a cathode-ray tube, of a signal in analog form, and further to provide for photographing the face of the cathode-ray tube by means of a camera incorporating therein a continuously-running microfilm.

An additional object of the invention is to provide for the recording of analog data directly upon microfilm, the visual development of this data occurring on the screen of a cathode-ray oscilloscope having a pair of electron scanning beams, one of such beams being employed to develop the analog signal and the other of such beams being employed to develop a series of regularly-spaced reference lines indicative of predetermined time intervals.

A still further object of the present invention is to provide for the recording on microfilm of an analog signal, and to also record on such film a series of horizontal reference indicia for permitting a determination of the signal's amplitude, together with a series of vertical reference indicia facilitating an evaluation of the time and/or phase characteristics of such signal.

Other objects, advantages, and novel features of the invention will become apparent from the following detailed description of the invention when considered in conjunction with the accompanying drawings wherein:

FIG. 1 is a schematic circuit diagram of a data recording system designed in accordance with a preferred embodiment of the present invention;

FIGS. 2, 3*a*, 3*b*, 4*a* and 4*b* are waveforms useful in explaining the operation of the system of FIG. 1;

Figure 1:
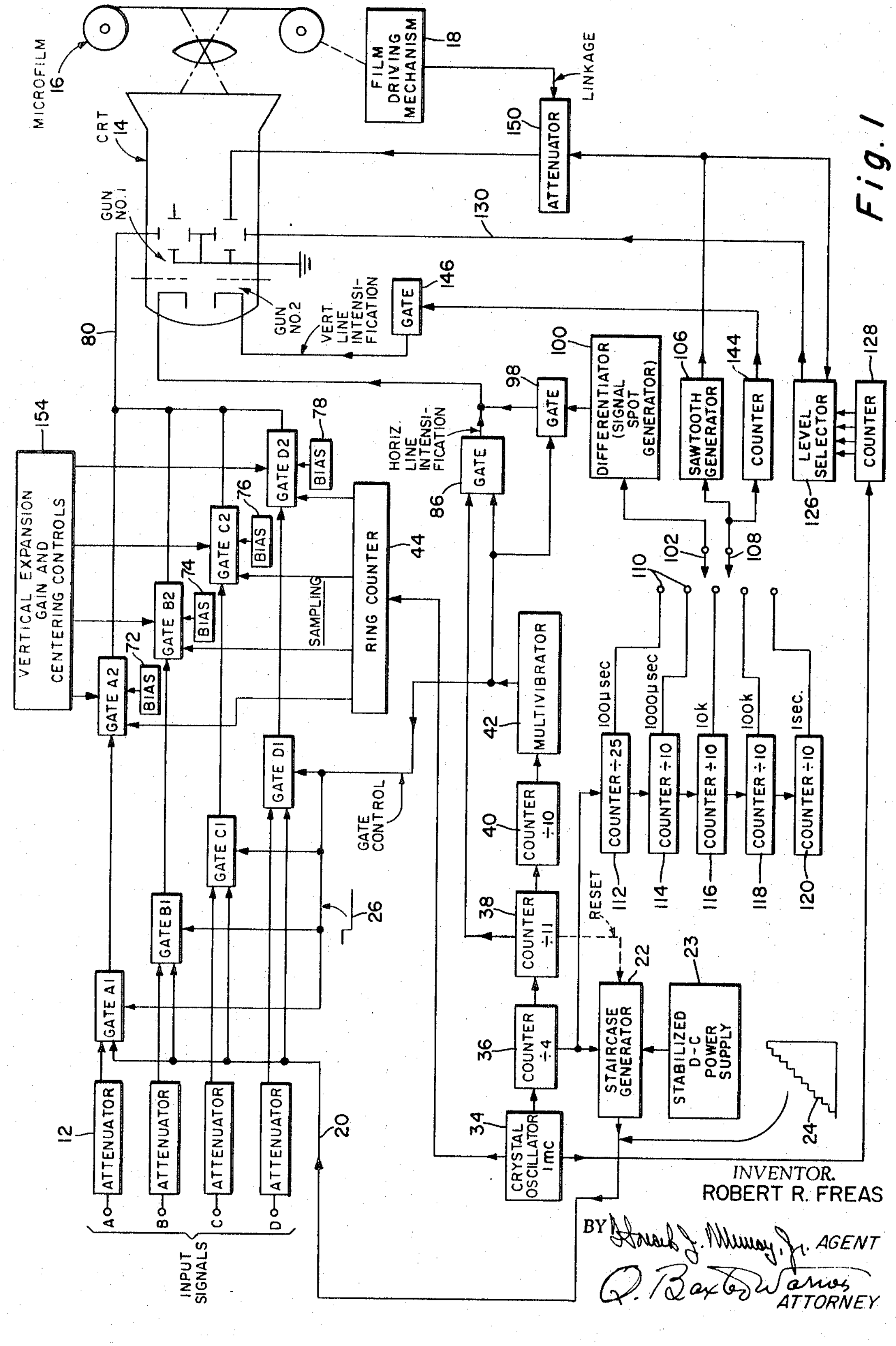
Figure 2:
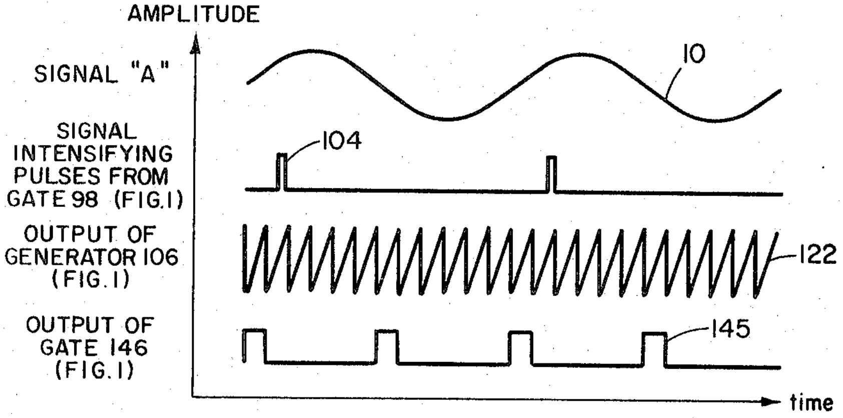

Referring now to the drawings, there is shown in FIG. 1 a preferred embodiment of the present invention by means of which four channels of intelligence may be simultaneously recorded upon a sensitized medium such as a microfilm. In describing the circuit arrangement of FIG. 1, it will be assumed that four independent signals are present, these signals being respectively applied to the four terminals designated in the left-hand portion of the drawing by the reference characters A, B, C and D. Purely by way of example, the input signal A may have a waveform such as illustrated in FIG. 2 of the drawings and identified by the reference numeral 10. It should be emphasized, however, that the four signals applied to the terminals A, B, C and D are completely independent of one another and are separately processed for presentation on different portions of the storage medium.

The signal 10, appearing at the input terminal A, passes through an attenuator 12 to a gating circuit A1. The remaining input signals received at terminals B, C and D are likewise separately attenuated and respectively passed to other gates B1, C1 and D1, as illustrated. The function of each of the gates A1, B1, C1 and D1 is to interrupt the passage of the respective input signals therethrough for pre-selected periods of time so that a specific control variation may be processed during periods of signal interruption. Such control variation is that which is effective to develop a plurality of reference indicia upon which the input 10 (for example) is superimposed, thereby facilitating a determination as to signal amplitude at any given instant of time.

Figure 5:
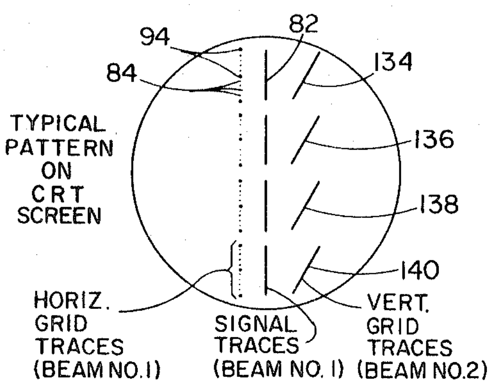
FIG. 5 illustrates a typical presentation which might be developed on the screen of the cathode-ray tube of FIG. 1, certain of the trace positions being displaced for clarity of description.

Before proceeding with a description of the manner in which the various signals applied to gates A1, B1, C1 and D1 are processed, it might be helpful to point out that these signals are presented as a pattern on the fluorescent screen of a cathode-ray tube 14, this pattern being exemplified by the showing of FIG. 5 of the drawings. At this point in the description, however, it will be sufficient to mention that the cathode-ray tube 14 is of the two-gun type in which dual electron beams are developed and deflected independently of one another. The pattern appearing on the screen of the cathode-ray tube 14 is photographically impressed upon a microfilm 16, the latter being driven in continuous fashion by some conventional mechanism 18. The manner in which the movement of microfilm 16 is synchronized with the presentation of data on the screen of the cathode-ray tube 14 will subsequently be brought out.

Figures 3A, 3B, 4A, 4B:
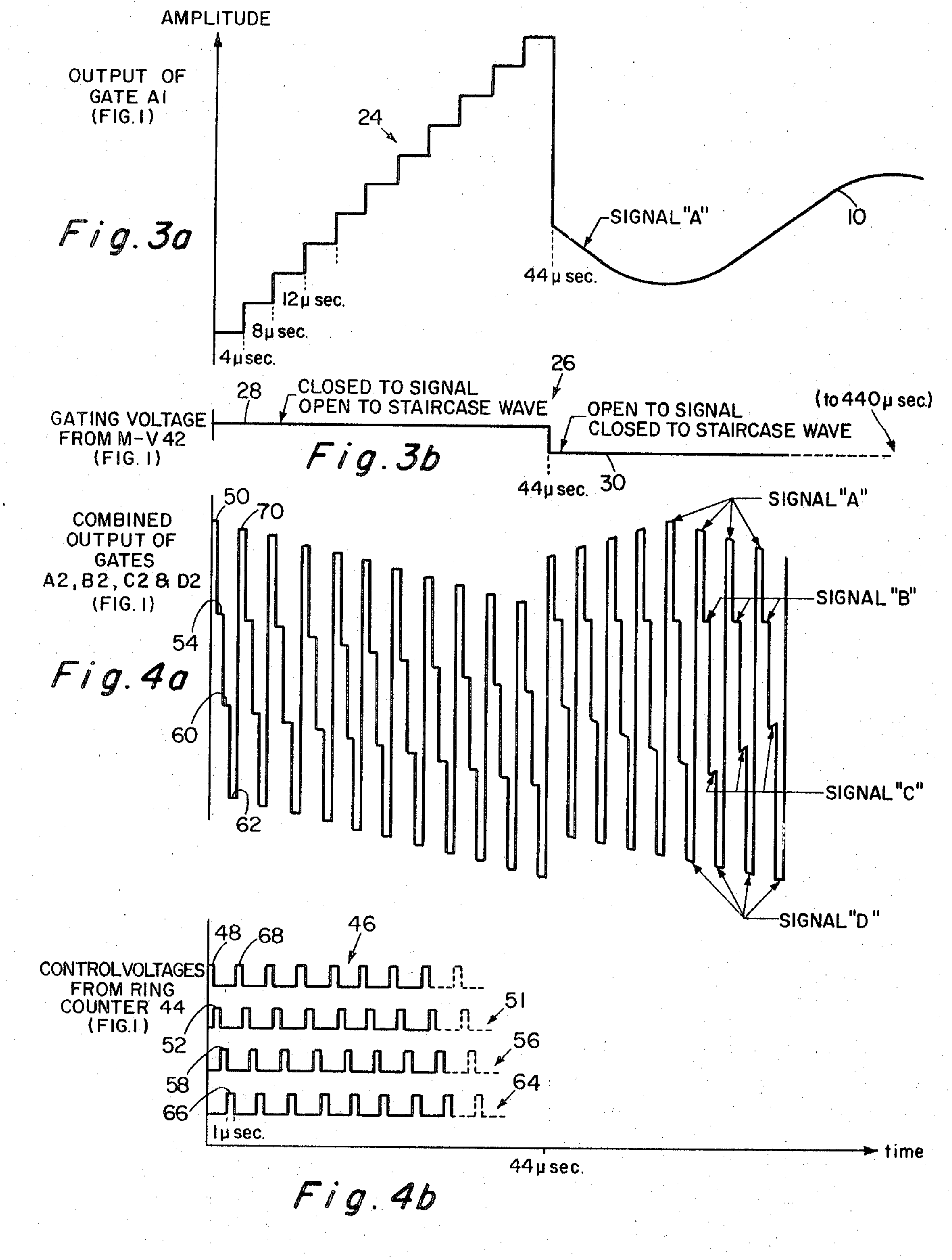

It has been stated above that each of the gates A1, B1, C1 and D1 receives not only a signal from its respective input terminal but also a signal over conductor 20 from a so-called "staircase" generator 22. The latter may be of known form and energized from a stabilized D-C source 23. It develops an output signal waveform having a configuration such as represented by the reference numeral 24 (see also FIG. 3*a*). It is the function of the gates A1, B1, C1 and D1 to pass a portion of the input signal applied thereto alternately with a cycle of the output of the staircase generator 22. FIGS. 3*a* and 3*b* bring out the manner in which the gates A1, B1, C1 and D1 are effective to bring about such a mode of operation, a description of these figures being given hereinafter. It should be mentioned that the staircase generator 22 produces an output waveform 24 having eleven steps, as best shown in FIG. 3*a*, each step being of four microseconds duration, so that the total time required for each output cycle of generator 22 is 44 microseconds. Each step possesses an increasing amplitude as shown.

It has been stated that the gates A1, B1, C1 and D1 alternately pass an input signal and the wave output of the staircase generator 22. Since the staircase wave 24 occupies a time period of 44 microseconds, it is desirable that the gates (such as A1) be open to the output of the generator 22 during this 44-microsecond period, and closed to the input signals during this same interval. Such action is brought about by the application to gate A1 (for example) of a control signal 26 (FIG. 3*b*) which is of such an amplitude 28 as to open the gate to the staircase wave 24 during the 44 microsecond period when such wave is present in the conductor 20. Following this period, the control voltage 26 shifts to a new level 30 which closes the gate A1 to the staircase wave 24 and opens the gate to the signal 10. It is contemplated that each of the gates remain open to the input signal for the remainder of a 440-microsecond period, following which the entire cycle is repeated.

This mode of operation of the gates A1, B1, C1 and D1 is achieved by utilizing a crystal oscillator 34 having a stabilized frequency of 1 megacycle. The output of the oscillator 34 is passed through a series of counters 36, 38 and 40 to a multivibrator 42, the latter acting to generate the rectangular wave 26 of FIG. 3*b*. The counter 36, for example, may act to divide the input wave from the oscillator by four, the counter 38 dividing by 11, and the counter 40 dividing by 10, thus yielding a 440-microsecond operating period for the multivibrator 42.

The output of gate A1 is now applied to a further gate A2. In corresponding fashion, the output of gate B1 to a further gate B2, C1 to a further gate C2, and D1 to a further gate D2. The function of these gates A2, B2, C2 and D2 is, firstly, to provide for the differential biasing of their respective input signals, and, secondly, to provide for the sampling of these signals in timed sequence.

The output of the gates A2, B2, C2 and D2 is shown in FIG. 4*a* of the drawings, this figure being drawn on the same time scale as that of FIGS. 3*a* and 3*b*. During the initial 44-microsecond period, when the gates A1, B1, C1 and D1 respectively pass the output of the staircase generator 22 (the wave 24) the input to gate A2, for example, is successively sampled at a four-microsecond rate by means of a ring counter 44 which is driven by the output of the crystal oscillator 34. This ring counter 44, which may be of a type known in the art, develops four output waves such as shown in FIG. 4*b* of the drawings. The output wave 46 is effective to sample the input to gate A2 so that during the sampling interval 48 a portion 50 of the staircase wave 24 is passed through gate A2. The ring counter output wave 51 has the leading edge of each of its pulses in time coincidence with the trailing edge of each of the pulses of the wave 46, so that the sampling interval 52 of wave 51, for example, will develop a waveform portion 54 in the output of gate B2. In similar fashion, sampling wave 56 will develop, during the sampling interval 58, a waveform portion 60 in the output of gate C2. The waveform portion 62 is developed by the sampling wave 64 during the sampling interval 66. Each of the sampling intervals of waves 46, 51, 56 and 64 is of one microsecond duration, so that the four successive sampling intervals above mentioned consume a total time period of four microseconds, following which the sampling cycle repeats itself, with the new sampling interval 68 of wave 46 developing the new wave portion 70.

The four microsecond total sampling time for one cycle of the output of the ring counter 44 corresponds to one step of the output of the staircase generator 22, as exemplified by the waveform 24 of FIG. 3*a*. Thus the next sampling cycle of counter 44 occurs at a different amplitude level than did the first sampling cycle. This results in the waveform portion 70 (for example) being displaced in amplitude from the previous corresponding waveform portion 50, as shown in FIG. 4*a*. Each unit of sampling develops four waveform portions (such as those identified as 50, 54, 60 and 62) but each unit of four is displaced downwardly (in the drawing) from the preceding unit, as best illustrated by FIGURE 4*a* of the drawings.

The ring counter 44 successively samples not only the staircase wave 24 but also the four input signals. However, it is desired that these input signals A, B, C and D be vertically displaced from one another on the fluorescent screen of the cathode-ray tube 14 of FIG. 1. To bring about such a vertical displacement, as suggested by FIG. 5 of the drawings, it is necessary to apply different vertical bias voltages to the four signals. Consequently, a source of DC bias potential 72 is applied to gate A2, a source of different bias potential 74 applied to gate B2, while similar sources of different bias potentials 76 and 78 are respectively applied to gates C2 and D2. The only function of these bias potentials is to shift the vertical position of the developed signal traces on the screen of the cathode-ray tube 14 so that the various signals are separated one from the other in order to facilitate their recording upon the microfilm 16. The respective outputs of the gates A2, B2, C2 and D2 are then combined in a single conductor 80 and applied to the vertical deflection plates of gun #1 of the cathode ray tube 14, as illustrated. Neither the control grid nor the horizontal deflection plates of this gun #1 are utilized for signals in carrying out the present concept.

Since the respective outputs of gates A2, B2, C2 and D2 are applied only the vertical deflection plates of gun #1 of cathode-ray tube 14, the resulting pattern on the cathode ray tube screen is in the form of a vertical line trace 82.

The same electron beam of gun #2 also traces a series of spots 84 (FIG. 5), these spots 84 representing the waveform 50, 54, 60 and 62 of the waveform of FIG. 4*a*, the beam only remaining momentarily at rest during these time periods. Between such periods, the beam is moving so rapidly across the screen as to produce no discernible light output. The repetition rate of these developed spots is so high that the resulting pattern traced on the screen of the cathode-ray tube 14 by gun #1 is made up of a series of spots 84 of two levels of light intensity and the signal trace 82 (for each of the four channels).

Figure 6:
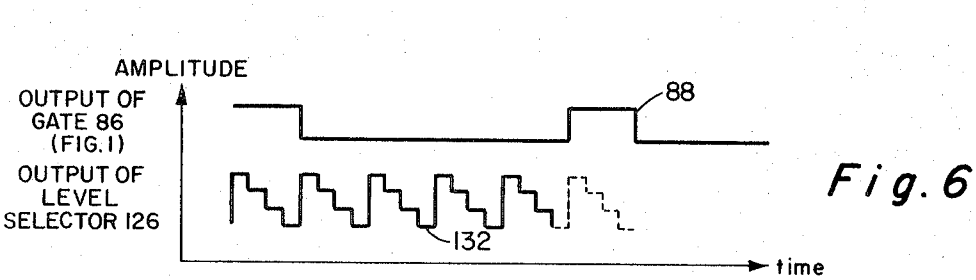
FIG. 6 shows further waveforms of voltage variations appearing in the circuit of FIG. 1.
Figure 7:
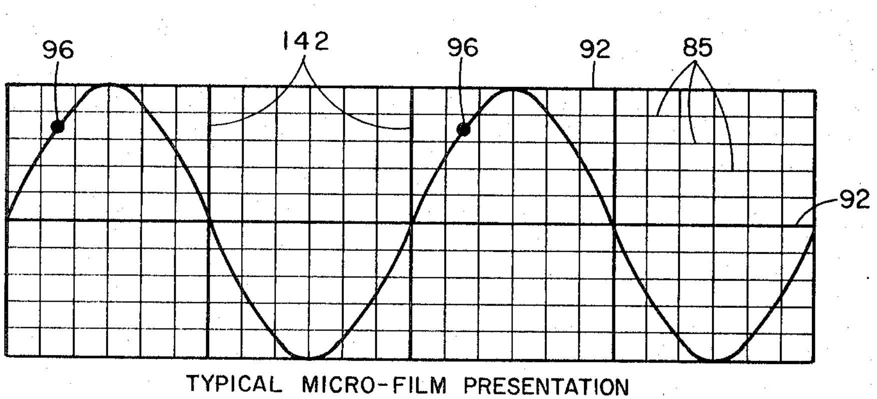
FIG. 7 is a typical composite presentation such as might be recorded on the microfilm of FIG. 1.

As best shown in FIG. 7, it is desired that certain selected ones of the horizontal grid lines 85 be intensified, or made more brilliant, in order to aid in determining the amplitude characteristics of the input signal. Consequently, the output of the counter circuit 38 of FIG. 1 is fed to a gating circuit 86 along with the output of the multivibrator 42. The result is that a wave 88 such as shown in FIG. 6 is developed, which in effect selects every 5th, 10th, or other desired step in the staircase wave 24 of FIG. 3*a* and increases the voltage applied to the cathode 90 of gun #1 of the cathode-ray tube 14 so as to increase the strength of the electron scanning beam and hence the light output produced thereby. This yields the intensified horizontal grid lines 92 (FIG. 7) as they appear in the microfilm pattern as a result of the intensification of particular spots 94 developed on cathode-ray tube screen of FIG. 5. In this connection, the spots 84 and 94 in FIG. 5 have been offset horizontally in the drawing from the signal trace 82 in order to bring out the particular characteristics of each one of these traces. However, it should be understood that actually the horizontal grid spots 84 and the signal trace 82 are each developed by the electron scanning beam of gun #1, and that they are superimposed one upon the other on a time-sharing basis. Since both of these signals appear in the conductor 80 and are applied solely to the CRT vertical deflection plates associated with gun #1, no possible horizontal displacement therebetween can occur.

It has been brought out above that the signal input to each of the gates A1, B1, C1 and D1 is successively sampled in a time-sharing fashion along with means for developing a plurality of vertically-displaced spots on the screen of the cathode-ray tube which, when transferred to a moving film, result in a series of horizontal grid lines facilitating ready interpretation of the input signal's amplitude characteristics. It will now be brought out how series of vertical lines can also be developed upon the screen of the cathode-ray tube, these vertical grid lines serving to enable a ready determination to be made of certain time and/or phase aspects of the input signal.

However, before proceeding with a description of the manner in which such vertical grid lines may be produced, it might be mentioned that, under certain circumstances, the analysis of an input signal requires an indication of its amplitude at certain regularly-recurring instants of time. To facilitate this determination, the present invention provides for the selection of a series of regularly-recurring instants at which one or more of the input signals may be intensified, such times being represented, for example, as "spots" illustrated by the reference numeral 96 in FIG. 7. These "spots" 96 are produced by periodically increasing the voltage applied to the cathode 90 of the tube 14 of FIG. 1. The recurrence frequency of these spots 96 is governed by the output of a gate 98 which is connected to a differentiator 100. The latter has an operating frequency determined in accordance with the position of a manually-actuatable switch 102, the function of the latter being more fully described hereinafter in connection with the development of the vertical grid lines of FIG. 7. It might be mentioned at this time, however, that in accordance with the position of switch 102 the horizontal displacement of successive spots 96 may be selected for a range which is limited only by the number of operative positions which switch 102 may be designed to possess. The signal applied to cathode 90 of tube 14 is in the form of a series of sharp pulses such as represented in FIGURE 2 by the reference numeral 104.

The means for developing the vertical grid lines on the screen of the cathode-ray tube 14 includes a sawtooth generator 106 the operating frequency of which is determined in accordance with the position of a further manually-actuated switch 108. The arms of each of the switches 102 and 108 may be selectively actuated independently to one of a plurality of contacting positions, the number of such positions being chosen in accordance with the range of operating frequencies desired. In the drawing, five contacts 110 are illustrated, these contacts being respectively connected to the outputs of a plurality of counter circuits 112, 114, 116, 118 and 120. The input of the counter circuit 112 is connected as shown to the output of the counter circuit 36. The latter divides the one-megacycle output of the crystal oscillator 34 by a figure of 4, while the counter circuit 112 is arranged to divide its input by a figure of 25. Consequently, the output of the counter circuit 112 is a wave having a recurrence frequency of 100 microseconds, and this wave is applied to one of the switch contacts 110. The counter circuit 114 divides its input by a figure of 10 to yield an output of 1,000 microseconds. Similarly, the counters 116, 118 and 120 each divide their respective inputs by 10, so that the outputs of these latter circuits are 10,000 microseconds, 100,000 microseconds, and 1 second, respectively. Manual actuation of the switches 102 and 108 thus permits the selection of any of these reference frequencies for application to either or both of the differentiator 100 and the sawtooth generator 106, as may be desired by the operator.

The output of the sawtooth generator 106 is a wave such as shown in FIGURE 2 and identified by the reference numeral 122. This output, which appears in conductor 124, is applied to a level selector 126. The latter is controlled by the output of a further counter circuit 128 which is directly directed to the crystal oscillator 34, as shown. The counter 128 may be similar in design to the counter circuit 36 and develops four outputs to the level selector 126, such that the sawtooth wave output of the generator 106, as applied over the conductor 130 to the vertical deflection plates of gun #2 of the CRT appears at four separate vertically-displaced levels in order to be superimposed upon the four signals A, B, C and D in a time-shared manner. The output of the level selector 126, may, for example, be as represented by the four-level step waveform 132 shown in FIG. 6. When this operation is carried out, the presentation on the screen of the cathode-ray tube (insofar as the vertical grid lines are concerned) will be as shown by the four traces 134, 135, 138 and 140, each of these traces being of course developed by gun #2 of the cathode-ray tube 14. The reason for the angular departure from a vertical position of each of the traces 134–140 will be subsequently described.

It is also desired to intensify certain selected ones of the vertical grid lines 141 appearing on the microfilm presentation of FIG. 7, these intensified grid lines being identified by the reference numeral 142. This result is achieved by means of a further counter circuit 144 the input of which is connected to switch 108. Depending upon the position of this switch, the output 145 of the counter circuit 144 (which passes through a further gate 146) may be applied to the cathode 148 of gun #2 so as to intensify the light output of the scanning beam of this gun at regularly-recurring intervals.

It has been stated above that the traces 134, 135, 138 and 140 as shown in FIG. 5, which represent the vertical grid lines to be superimposed upon the horizontal grid lines and signal presentation, thereby resulting in a pattern such as illustrated in FIG. 7, are angularly displaced from the vertical. The reason for such an orientaiton of the vertical grid line traces on the cathode-ray tube screen is that the movement of the microfilm 16 past the screen of the cathode-ray tube results in an effective repositioning of such lines as they are developed on the film itself. In order to accomplish this repositioning in such a manner that the lines appear on the film in precisely vertical position, the film driving mechanism 18 of FIG. 1 is related with the operation of the sawtooth attenuator 150 such that the film speed is precisely coordinated with the angle at which the sawtooth wave is displayed on the CRT. Such relationship may be achieved in conventional fashion by means of a linkage 149 which regulates the amplitude of the attenuator output as a function of the rate of film motion. To achieve the angular orientation of the traces 134, 135, 138 and 140, the output of the sawtooth generator 106 is applied through an attenuator 150 to the horizontal deflection plates of gun #2 of the cathode-ray tube 14 over a conductor 152. When the attenuator 150 is related properly to the speed at which the microfilm 16 passes the screen of the tube 14, the traces 134, 136, 138 and 140 of FIG. 5 will appear in precisely vertical position on the film 16 as shown in FIG. 7.

When the equipment of FIG. 1 is being placed in condition for operation, conventional gain and centering controls 154 may be utilized for adjustment of beam position and intensity. A vertical expansion of the presentation on the screen of cathode-ray tube 14 is also possible during the adjustment period if desired by the operator. The switch 108 is then actuated to provide vertical grid lines at the desired spacing, the latter being determined by the selected position of switch 108 on contacts 110. Switch 102 is then actuated to adjust the timing or spacing of the intensified signal portions 96. The counter 144 shown in FIG. 1 provides for the intensification of every *n*th vertical grid line, but, if desired, this counter 144 may be made variable to select other vertical grid lines for intensification. The film speed control is also adjusted to set the rate at which the microfilm 16 passes the screen of the CRT 14, and to bring the traces 134, 136, 138 and 140 into substantially vertical alignment on the film.

It has been found in practice that a 2-centimeter deflection per signal channel is adequate, thus permitting four signals (such as A, B, C and D in FIG. 1) to be displayed on a cathode-ray tube having a screen approximately 5 inches in diameter. It has also been found that two adjacent cathode-ray tubes can be photographed by a single camera, thus providing eight information channels on the same film. Since the vertical deflection for both cathode-ray tubes would be from a common source, the vertical markers for all of the channels would be identical time-wise.

Since the present concept involves the alternate presentation of signal data and reference data in a time-shared manner, it is essential that the cathode-ray tube 14 be provided with a screen coated with a short-persistence phosphor. However, such tubes are commercially available and have proven to be fully satisfactory in actual practice.

Not only does the present concept permit the recording of data which may vary at a rate as high as 40,000 kc., but the use of microfilm enables the projection of the recorded data on a screen for multiple viewing. Much information may also be stored in a small space. The film speed may reach 5,000 in./sec. as compared to 100–200 for present methods, each film strip being 2,000 feet (for example) in length. Microfilm recording also permits maximum utilization of the sensitized medium and reduces operating costs as compared to other methods now available.

Obviously many modifications and variations of the present invention are possible in the light of the above teachings. It is therefore to be understood that within the scope of the appended claims the invention may be practiced otherwise than as specifically described.

I claim:

1. Apparatus for photographically recording on a sensitized medium the visual representation of an electrical signal, such signal varying in analog fashion over a period of time, said apparatus comprising:

means for developing a visual representation of said signal;

a light-sensitive medium arranged to be exposed to such visual representation;

means for producing a positional displacement between said light-sensitive medium and said signal-developing means, said positional displacement occurring continuously at a constant rate, whereby changes in the characteristics of said signal are sequentially recorded on different portions of said medium;

further means, including a portion of said signal-developing means, for developing a visual presentation in the form of a set of reference indicia, such indicia also being recorded on said medium and in effect superimposed on said recorded signal;

both the development and recording of said signal and the development and recording of said reference indicia occurring in a cyclically-repetitive time-shared manner, with the signal development and recording intervals alternating time-wise with the reference indicia development and recording intervals;

said light-sensitive medium being in the form of a microfilm, and said means for producing a positional displacement between said light-sensitive medium and said signal developing means including a camera of the continuously-running type;

said means for developing a visual representation of said electrical signal including a cathode-ray tube having at least one electron scanning beam and a face plate coated with a short-persistence phosphor; and said means for developing a visual presentation in the form of a set of reference indicia including means for causing the electron scanning beam of said cathode-ray tube to trace a series of spaced-apart points on the screen of said tube, said series of points being laid down in linear fashion and normal to the direction in which the positional displacement between said light-sensitive medium and said signal-developing means occurs.

2. The combination of claim 1, in which said cathode-ray tube includes a second electron scanning beam, further comprising means for causing said second electron scanning beam to sequentially develop a series of traces on the screen of said cathode-ray tube positionally displaced from the traces developed by said first-mentioned electron scanning beam, the traces developed by said second electron scanning beam being so oriented on said screen as to establish a series of spaced-apart reference indicia on said light-sensitive medium which are normal to the direction in which the positional displacement between said light-sensitive medium and said signal-developing means occurs.

3. Apparatus for photographically recording on a sensitized medium the respective visual representations of a plurality of electrical signals, such signals being capable of varying independently of one another in analog fashion over a period of time, said apparatus comprising:

a cathode-ray tube having a pair of electron scanning beams together with means for independently deflecting said beams so as to develop a pair of traces on the fluorescent screen of said tube;

a microfilm camera of the continuously-running type, said camera being arranged so that the microfilm therein is exposed to the light developed as the electron scanning beams of said cathode-ray tube impinge the fluorescent screen thereof;

means for developing a cyclically-varying voltage wave the amplitude of which increases periodically in a series of steps;

means for applying such voltage wave to each of the channels in which said plurality of signals appears;

means for cyclically interrupting the passage of the signal in each of said channels to pass said voltage wave during the periods of such interruption;

means for cyclically sampling the interrupted signals in each of said channels in timed sequence;

means for differentially biasing the signals so sequentially sampled;

means for combining the sampled and biased signals;

means for applying the combined signals to the deflecting means associated with one of the electron scanning beams of said cathode-ray tube so as to develop a plurality of sets of spaced-apart traces equal in number to the number of electrical signals;

means for developing a further cyclically-varying voltage wave having a frequency which is a function of the frequency at which the said signals are cyclically sampled;

means for applying said further cyclically-varying voltage wave to the deflecting means associated with the remaining one of the electron scanning beams of said cathode-ray tube so as to develop a plurality of spaced-apart traces respectively associated with the traces developed by said one electron scanning beam but positionally separate therefrom; and means for optically superimposing on said microfilm the respective visual representations developed for each individual signal of said plurality by the two electron scanning beams of said cathode-ray tube.

4. Apparatus in accordance with claim 3, wherein the said cyclically-varying voltage wave having an amplitude which increases periodically in a series of steps is effective during the time period of its application to the deflecting means associated with said one electron scanning beam to cause the latter to develop a series of spaced-apart spots on said fluorescent screen for each signal channel, such spots, when photographically recorded on said microfilm, being in the form of a series of parallel spaced-apart indicia extending in the direction of movement of such film through said camera.

5. Apparatus in accordince with claim 4, further comprising means for intensifying every $n$th one of the parallel spaced-apart indicia recorded on said microfilm and which extend in the direction of movement of such film through said camera.

6. Apparatus in accordance with claim 5, further comprising means for optically superimposing on said microfilm for each signal channel the traces respectively developed by the two electron scanning beams of said cathode-ray tube, the traces respectively developed for each signal channel by the said remaining one of said electron scanning beams, when photographically recorded on said microfilm, being in the form of a series of parallel spaced-apart indicia extending normal to the direction of movement of such film through said camera.

7. Apparatus in accordance with claim 6, further comprising means for intensifying every $n$th one of the parallel spaced-apart indicia extending normal to the direction of movement of such film through said camera.

References Cited

UNITED STATES PATENTS

| | | | |
|---|---|---|---|
| 2,428,369 | 10/1947 | Kammer | 346—109 X |
| 2,489,253 | 11/1949 | Andre | 346—110 X |
| 2,873,396 | 2/1959 | Baldwin | 346—110 X |
| 2,943,220 | 6/1960 | McNaney | 313—70 X |

RICHARD B. WILKINSON, *Primary Examiner.*

J. W. HARTARY, *Assistant Examiner.*